(12) United States Patent
Mezger et al.

(10) Patent No.: US 6,587,776 B1
(45) Date of Patent: Jul. 1, 2003

(54) METHOD AND ARRANGEMENT FOR CONTROLLING THE RPM OF A DRIVE UNIT

(75) Inventors: Werner Mezger, Eberstadt (DE);
Ruediger Weiss, Moetzingen (DE);
Michael Nicolaou, Ober-Ramstadt (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/641,946

(22) Filed: Aug. 21, 2000

(30) Foreign Application Priority Data

Aug. 21, 1999 (DE) ......................... 199 39 822

(51) Int. Cl.$^7$ ............................................. F02D 43/04
(52) U.S. Cl. ............ 701/113; 123/339.11; 123/339.21; 700/19

(58) Field of Search .................. 701/110, 113; 123/339.11, 339.21; 700/19, 71, 72

(56) References Cited

U.S. PATENT DOCUMENTS

| 4,441,471 A | | 4/1984 | Kratt et al. ................ 477/111 |
| 5,979,158 A | * | 11/1999 | Kaiser et al. ................ 60/274 |
| 6,116,213 A | * | 9/2000 | Yasui et al. ............ 123/339.11 |

FOREIGN PATENT DOCUMENTS

| JP | 55-131532 | * 10/1980 | ............. F02C/9/26 |

* cited by examiner

*Primary Examiner*—Andrew M. Dolinar
(74) *Attorney, Agent, or Firm*—Walter Ottesen

(57) ABSTRACT

The invention is directed to a method and an arrangement for the rpm control of a drive unit. A control is provided having at least two components. At the start of the drive unit, these two components are activated one after the other.

8 Claims, 4 Drawing Sheets

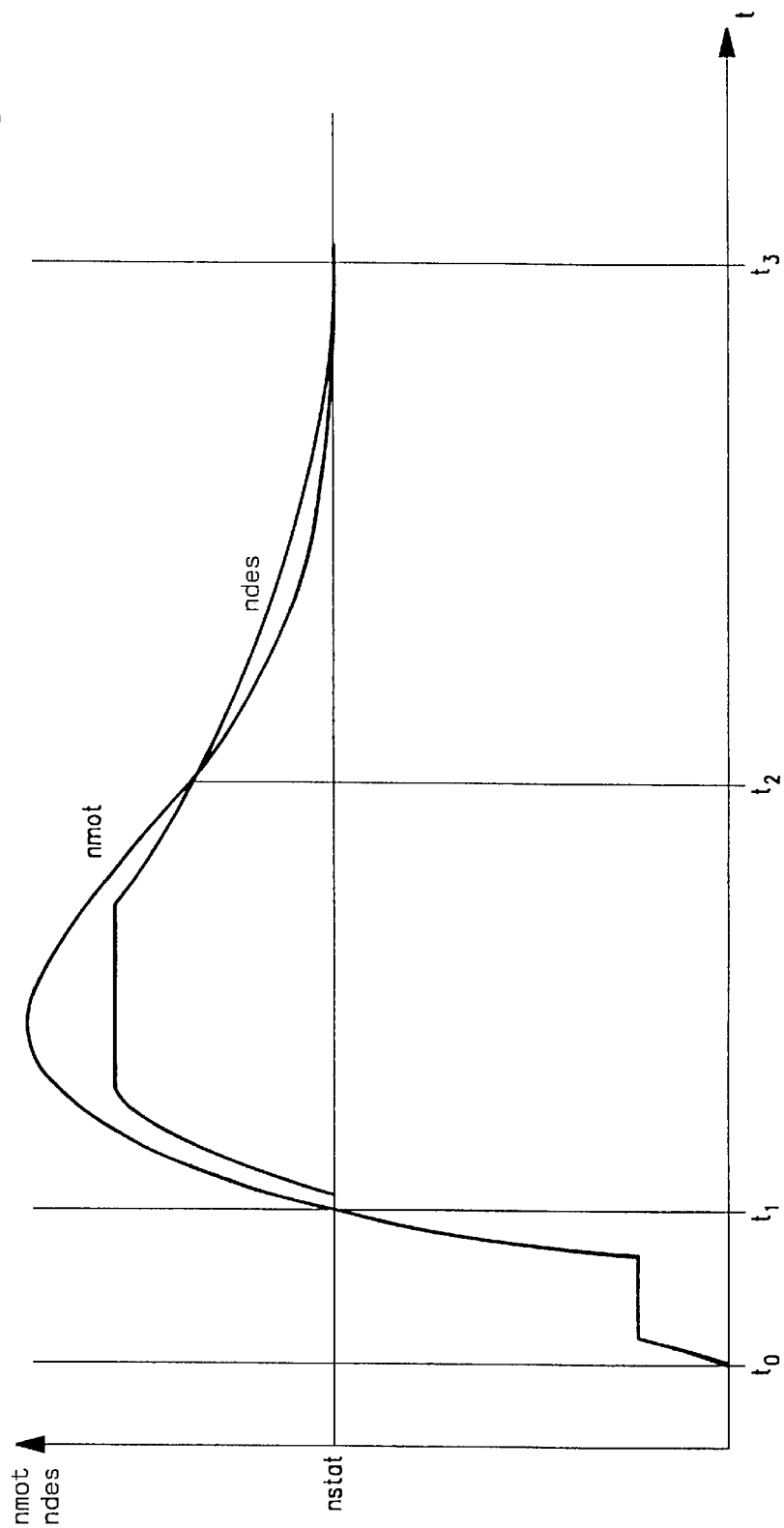

METHOD AND ARRANGEMENT FOR CONTROLLING THE RPM OF A DRIVE UNIT

BACKGROUND OF THE INVENTION

A method and an arrangement for controlling the rpm of a drive unit is disclosed with respect to the example of an rpm control in U.S. Pat. No. 4,441,471. There, a control of the idle rpm is carried out at least in the idle operating state of the drive unit in dependence upon a pregiven rpm desired value and a measured rpm actual value by actuating a positioning element controlling the rpm of the drive unit. The rpm desired value is dependent upon operating variables. The start phase of the drive unit is also considered in addition to the normal control range. If the rpm is still below a pregiven minimum rpm, then the control element, which controls the rpm, is driven with a pregiven fixed drive signal to ensure adequate start air. When the minimum rpm is exceeded, a control of the rpm in the idle state takes place with the aid of a controller. The controller includes a proportional component, an integral component and a differential component.

In some applications, this known solution displays an unsatisfactory performance during the start phase. Because of the specific characteristics at start, the rpm exhibits a clear overshoot in this phase above the steady-state rpm provided in the subsequent operation. The known controller reacts to the occurring rpm deviation starting when the minimum rpm is exceeded so that especially its integral component operates in an unfavorable operating range during the rpm overshoot. The transient state of the rpm to the steady-state desired rpm is correspondingly uncomfortable. Comparable effects are exhibited not only by rpm controllers but also by controllers which control a variable, which is related to the rpm, such as the torque, the supplied air, the power, the output rpm, et cetera.

SUMMARY OF THE INVENTION

It is an object of the invention to provide measures in combination with a method and an arrangement for the control of rpm of a drive unit wherein the performance of the drive unit is improved in the start phase.

The method of the invention is for controlling the rpm of a drive unit and includes the steps of: providing a controller having at least first and second components; and, with the start of the drive unit, forming a control signal with the controller by first activating the first component so that the control signal is based on the first component and thereafter activating the second component so that the control signal is based on both the first and second components.

The separate activation of components of the controller, which carries out the rpm control, optimizes the start phase of the drive unit. Under the term "start phase", the actual start including post-start is understood starting with the actuation of the starter or the switching on of the supply voltage (ignition on) up to the transient state to the steady-state rpm. With the relatively early activation of the proportional component and/or the differential component, the rpm overshoot is effectively countered by the controller without a disadvantageous control performance occurring in the subsequent transient or settling operation. This is so because the integral component of the control, as a rule, is activated later than the dynamic controller components.

It is especially advantageous that a constant position of the throttle flap is adjusted during the actual start phase and the activation of the controller to minimize the rpm overshoot takes place via a separate activation of the controller components. In this way, a simplification of the application of the start operation and especially the formation of the overshoot is achieved because the controller characteristics and/or the changing ambient conditions are of no consequence in the context of the actual start phase.

It is especially advantageous that a pregiven time is provided which ensures an activation also of the integral component of the controller in the case of an unfavorable drag torque.

Furthermore, a further time condition is provided in an advantageous manner via which a forced activation of all components of the controller takes place, for example, when there is a defective start or a poor start.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
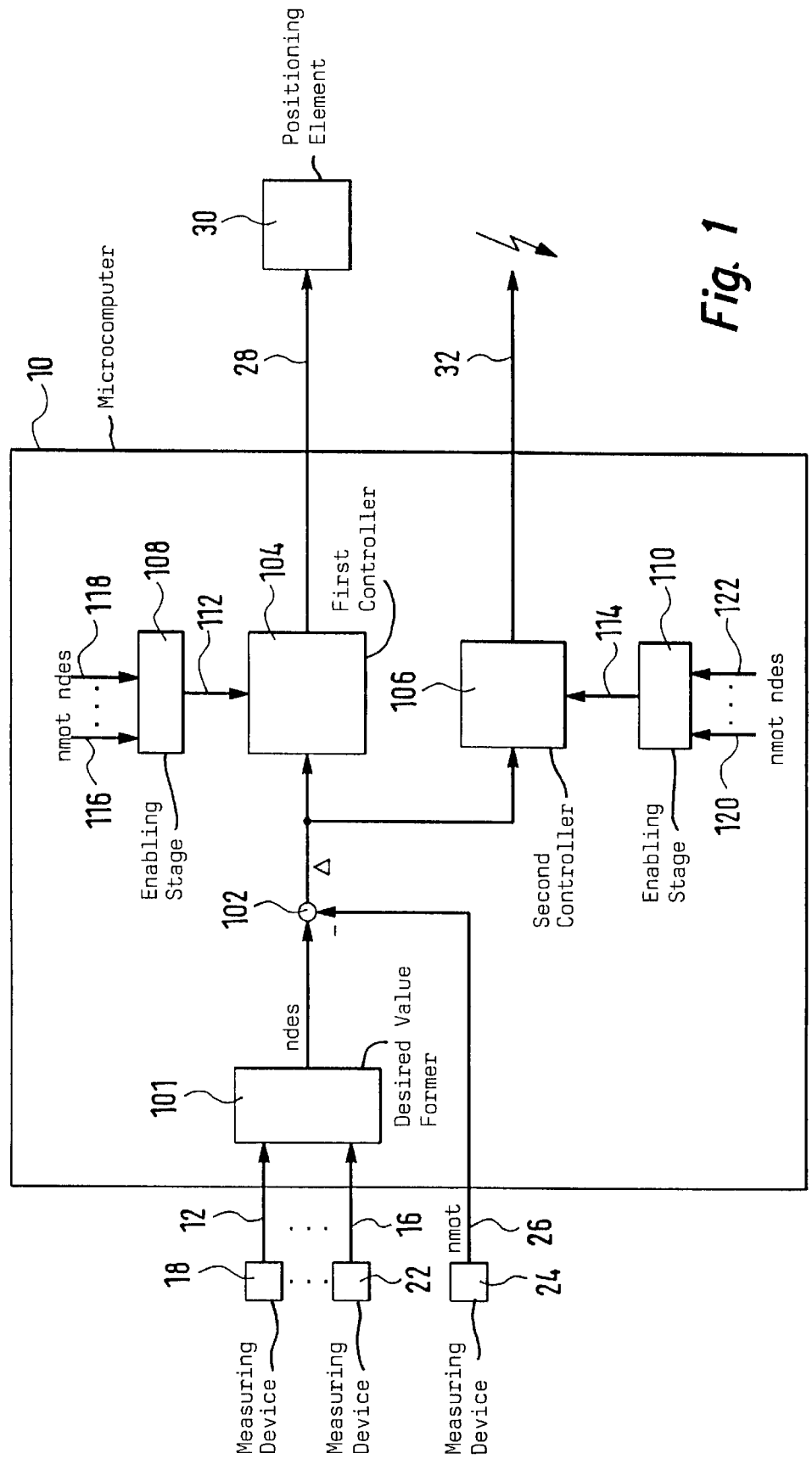
FIG. 1 is a schematic of a preferred embodiment of an idle rpm controller shown in the context of a sequence diagram.
Figure 2:
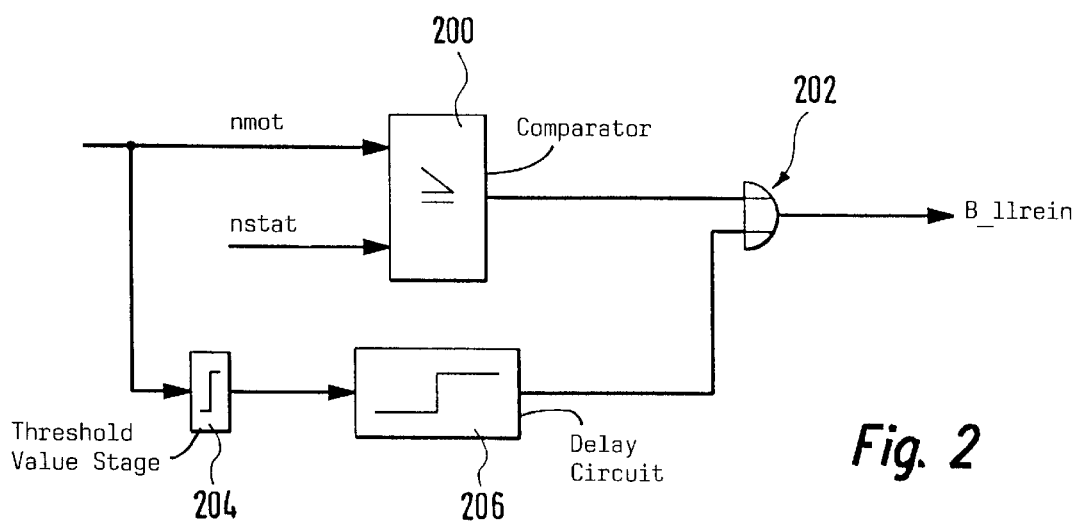
FIG. 2 shows an embodiment of a sequence diagram for activating the idle control.
Figure 3:
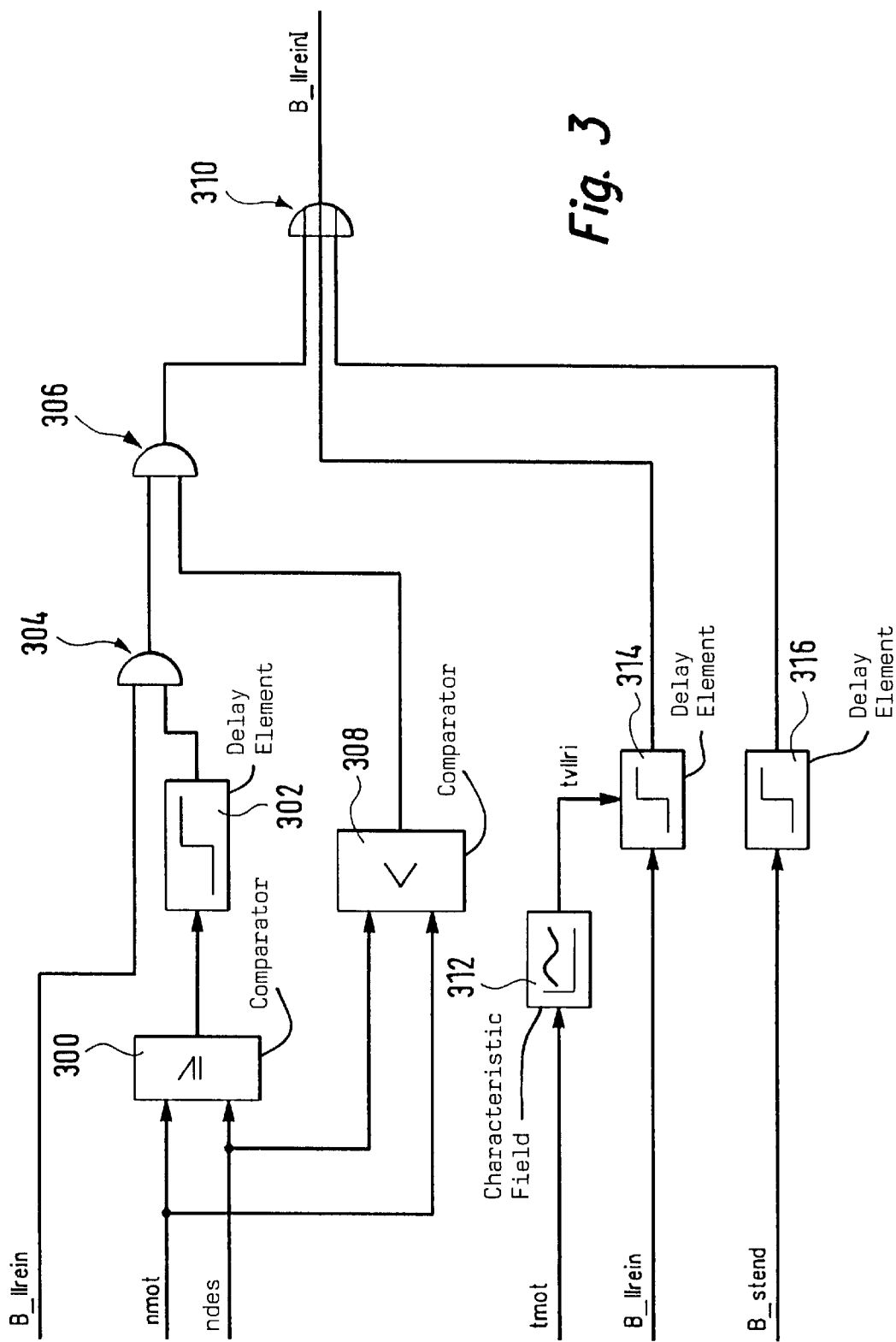
FIG. 3 shows another sequence diagram representing a program of a microcomputer of a control unit for controlling the drive unit; and, FIG. 4 shows a time diagram with reference to which the operation of the invention will be shown hereinafter.

The sequence diagrams of FIGS. 1 to 3 represent programs of a microcomputer of a control unit for controlling a drive unit. The individual elements of the diagrams represent programs, subprograms and program steps which execute the indicated functions.

FIG. 1 shows a sequence diagram of an idle rpm controller which represents a program of a microcomputer 10 of a control unit for controlling a drive unit of a vehicle. A desired value former 101 is provided to which signals are transmitted from measuring devices 18 to 22 via input lines 12 to 16, respectively. These signals represent operating variables which influence the idle rpm. Operating variables of this kind are, for example, the engine temperature and/or the states of ancillary consumers such as a climate control system, et cetera. Depending upon these variables, the desired value former 101 forms the desired value ndes for the idle operation of the drive unit. This formation of the desired value takes place in accordance with pregiven tables, characteristic lines, characteristic fields or computation steps.

In the preferred embodiment, the desired rpm tracks the actual rpm in the same manner as in the state of the art mentioned initially herein; that is, the desired rpm is increased when the actual rpm increases, for example, because of the driver influence or during start. This desired value is mentioned as the tracking desired value to distinguish from the steady-state desired value which does not track the actual rpm. The formed desired value ndes is then supplied to a comparator 102 wherein the formed desired value is set into relationship with the measured engine rpm nmot. A signal, which represents the actual rpm, is determined in the measuring device 24 and is supplied via the line 26 to the control unit 10, that is, to the microcomputer 10.

In the comparator 102, the deviation Δ of the actual rpm nmot from the desired rpm Ndes is determined. The control deviation Δ is then supplied to a first controller 104 and to a second controller 106. The first controller 104 forms an output signal in dependence upon the control deviation Δ. This output signal actuates via the output line 28 at least a positioning element 30 which influences the air supply to an internal combustion engine. The controller 106 forms an output signal in dependence upon the control deviation Δ and this output signal controls at least the ignition angle of the engine via the line 32. Air supply and ignition angle are thereby influenced in such a manner that the control deviation is reduced.

In the preferred embodiment, the controller 104 includes at least an integral component which integrates the control deviation as a function of time to form the output signal. Depending upon the embodiment, proportional components and/or differential components are also provided. An additional intervention into the ignition angle and/or the fuel metering is provided in one embodiment. The controller 106 for adjusting the ignition angle and/or the fuel metering includes at least one proportional component and/or one differential component. The proportional component and/or the differential component amplifies and/or differentiates the control deviation to form the output signal.

The controllers are provided with respective enabling stages 108 and 110. Depending upon the supplied input signals, the enabling stages (108, 110) enable the controllers 104, 106, respectively, via corresponding enabling lines 112 and 114. The enabling signals are determined on the basis of operating variables. These variables are supplied via lines 116 to 118 to the enabling stage 108 and via lines 120 to 122 to the enabling stage 110. These operating variables are primarily the engine rpm nmot and the desired rpm Ndes (steady-state desired rpm and the tracking desired rpm). The specific procedure for enabling the controller component is explained hereinafter based on the sequence diagrams of FIGS. 2 and 3.

In other embodiments, an rpm controller is not used for rpm control; rather, a control of other operating variables such as torque, air supply, power, et cetera, is used. These operating variables are related to the rpm. The corresponding measures are taken with such a controller.

In the preferred embodiment, the activation of the idle controller components takes place at different time points for optimizing the rpm trace in the start phase. Accordingly, especially the integral component is activated later than the proportional component and/or the differential component.

In the preferred embodiment, the integral component of the controller is activated when the engine rpm is greater than the tracking desired rpm and subsequently again drops below this tracking desired rpm. The integral component is therefore then activated when the actual rpm drops below the tracking desired rpm for the first time after the start overshoot of the rpm. A further activation criterion for the integral component is the elapse of a pregiven time after switching on the idle control. In this way, the integral component is switched on when the engine rpm remains for a longer time above the tracking desired rpm, for example, because of the wrong oil, non-active consumers, et cetera. A third criterion for switching on the integral component is the elapse of a further time condition which forcibly switches on the entire idle control when there is a poor start or a defective start. In this case, the integral component becomes active together with the other controller components. An operating situation of this kind is assumed when a predetermined time has elapsed after reaching the start end rpm (for example, several hundred revolutions per minute) without the steady-state rpm having been reached.

The other components of the idle control are activated earlier when the actual rpm exceeds the steady-state desired rpm. Should the steady-state desired rpm not be reached within a predetermined time after reaching the start-end rpm, then, as mentioned above, the switch-on of the idle control is perforce effected.

The realization of the activation of the controller components takes place in various ways depending upon the embodiment. In one embodiment, the particular controller constant (for example, the integral constant) is set from the value 0 to a pregiven value for activation. In other embodiments, switching elements are present which enable the input of the particular component for activation. In the preferred embodiment of a computer program, this is realized via corresponding inquiry steps. For a non-active component, the program steps, which normally compute this component, are not executed.

FIG. 2 shows an embodiment of a diagram for activating the idle control. The actual engine rpm nmot is compared in a comparator 200 to the steady-state desired rpm nstat, which is fixed in dependence upon engine temperature and, for example, the status of ancillary consumers. If the engine rpm exceeds the steady-state desired rpm, then the comparator outputs a status signal which sets the signal B_llrein to switch on the idle control via the logic OR-logic element 202. This signal leads, for example, to the enablement of the controller 106 via the line 114 whereupon the controller 106 counters the rpm overshoot in the start phase with a corresponding change of the ignition angle which reduces the overshoot. Furthermore, the engine rpm is compared in a threshold value stage 204 to the start-end rpm. This start-end rpm lies at several 10 to several 100 rpm. If the engine rpm exceeds the start-end rpm, then a corresponding status signal is transmitted to a delay circuit 206. This delays the signal by a pregiven time, which, in the preferred embodiment, is several seconds long. When this time has elapsed, the signal B_llrein is set (if not set already) via the OR-element 202 so that the controller is perforce activated when the start-end rpm is indeed exceeded but the steady-state rpm is not reached within a pregiven time. This indicates a poor start or a defective start so that a forced switch-on of the idle control appears necessary with a view to the subsequent operation of the drive unit. The signal B_llrein activates at least the proportional component and/or the differential component of the controller for the ignition angle intervention and/or the fuel metering intervention but not the integral component of the idle controller.

The procedure for forming the enabling signal B_llrein for the integral component is shown in the sequence diagram of FIG. 3. The signal B_llrein activates the controller 104 or its integral component via the line 112. First, the tracking desired rpm ndes and the engine rpm nmot are compared in a comparator 300. If the actual rpm exceeds the desired rpm, which tracks in dependence upon the actual rpm, then the corresponding signal is supplied to a delay stage 302 wherein the signal is delayed for a predetermined time, for example, several milliseconds. Thereafter, the signal is supplied to an AND-logic element 304 to which the activation signal of the idle control B_llrein is supplied at a second input. If both signals are present, then the output signal of the AND-logic element 304 is supplied to the AND-logic element 306. A signal, which is the output signal of a comparator 308, is supplied to the second input of the AND-logic element 306. The actual rpm and the tracking desired rpm ndes are also supplied to the comparator 308. In the comparator 308, a check is made as to whether the actual rpm has again dropped below the tracking desired rpm. If this is the case, then the comparator 308 generates an output signal which sets the output signal of the AND-logic element 306 when the signal of the AND-logic element 304 is present. The output signal is outputted via the OR-logic element 310 and defines the activation signal B__llrein of the integral component of the controller 104. In this way, the integral component of the controller is activated in the normal case when the tracking desired rpm is exceeded by the actual rpm and when again there is a drop below the tracking desired rpm. The tracking of the desired rpm takes place displaced relative to the actual rpm and is limited as shown also in the state of the art mentioned initially herein.

In addition, a time value tvllri is determined in a characteristic line, table or characteristic field 312 in dependence upon the engine temperature tmot. The time value tvllri is applied to a delay element 314. This delay element delays the supplied activation signal B__llrein of the idle control. After elapse of this time (which can be several 10 up to 100 milliseconds), the delay element 314 generates an output signal which sets the signal to switch on the integral component via the OR-logic element 310. In this way, the integral component is activated in unfavorable drag torque conditions (wherein the engine rpm does not drop below the tracking desired rpm) after the elapse of a predetermined time after switch-on of the idle control.

Furthermore, an additional delay element 316 is provided wherein the signal, which is formed in 204, is delayed for a specific time when there is an overshoot of the start-end rpm. The delay is, for example, a few seconds. If the delay time has elapsed with the signal present, then a signal is outputted via the OR-logic element 310 which sets the integral component. This defines the forced switch-on of the idle control for a poor start wherein all controller components are simultaneously activated.

In FIG. 4, a time diagram is shown which illustrates the time-dependent trace of the engine rpm nmot and the desired rpm ndes. At time point $t_0$, the starter is actuated. The rpm is then increased, initially with the action of the starter and thereafter with the action of the combustion of the engine. The steady-state desired rpm nstat is exceeded at time point $t_1$. This leads to the activation of the idle control and to the enablement of the proportional component and/or the differential component of the controller 106. Thereafter, the rpm overshoot as well as the tracking of the desired rpm for an active idle control is shown in the time span between $t_1$ and $t_2$ in FIG. 4. At time $t_2$, the engine rpm drops for the first time again below the tracking desired rpm ndes. This leads to the activation of the integral component which then contributes to swinging in the actual rpm to the steady-state desired rpm (transient state to steady state) at time point $t_3$. At time point $t_3$, the start phase is completed and the idle operation of the drive unit begins.

In the above embodiment, the integral component is activated when there is a drop below the tracking desired rpm. In lieu of the tracking desired rpm, an rpm threshold is pregiven in another embodiment for activating the integral component. This rpm threshold deviates from the desired rpm.

It is understood that the foregoing description is that of the preferred embodiments of the invention and that various changes and modifications may be made thereto without departing from the spirit and scope of the invention as defined in the appended claims.

What is claimed is:

1. A method for controlling the rpm of a drive unit, the method comprising the steps of:
   providing a controller having at least first and second components; and,
   with the start of said drive unit, first activating said first component so as to effect a control of said drive unit based on said first component and thereafter activating said second component so that said control is based on both said first and second components.

2. A method for controlling the rpm of a drive unit, the method comprising the steps of:
   providing a controller having at least first and second components;
   with the start of said drive unit, first activating said first component so as to effect a control of said drive unit based on said first component and thereafter activating said second component so that said control is based on both said first and second components; and,
   wherein said first component is at least one of a proportional component and a differential component and said second component is an integral component.

3. The method of claim 2, comprising the further step of simultaneously activating both said first and second components after a pregiven time has elapsed after a pregiven engine rpm is exceeded without having reached a steady-state rpm of said engine.

4. A method for controlling the rpm of a drive unit, the method comprising the steps of:
   providing a controller having at least first and second components;
   with the start of said drive unit, first activating said first component so as to effect a control of said drive unit based on said first component and thereafter activating said second component so that said control is based on both said first and second components; and,
   wherein said drive unit is an engine and the method comprises the further step of activating said first component when the engine rpm exceeds a steady-state desired rpm for the first component after the start of the engine.

5. The method of claim 4, comprising the further step of activating said second component when the actual rpm again drops below a pregiven rpm threshold after said actual rpm exceeds the steady-state desired rpm.

6. The method of claim 5, wherein said pregiven rpm threshold is the rpm-dependent tracking desired rpm.

7. An arrangement for controlling the rpm of a drive unit, the arrangement comprising:
   at least one microcomputer for controlling said rpm;
   said microcomputer functioning to implement at least first and second components; and,
   said microcomputer including means for first activating said first component when said drive unit is started so that the control is based on said first component and, thereafter, activating said second component so that said control is based on both said first and second components.

8. A method for controlling the rpm of a drive unit, the method comprising the steps of:
   providing a controller having at least first and second components;
   with the start of said drive unit, first activating said first component so as to effect a control of said drive unit based on said first component and thereafter activating said second component so that said control is based on both said first and second components;
   wherein said first component is at least one of a proportional component and a differential component and said second component is an integral component; and,
   activating said second component after a predetermined time has elapsed after switching on said first component.

* * * * *